Patented June 11, 1940

2,204,476

UNITED STATES PATENT OFFICE 2,204,476

PRODUCTION OF HYPOSULPHITES

Kurt William Freddy Dorph, Niagara Falls, N. Y., assignor to The Mathieson Alkali Works, Inc., New York, N. Y., a corporation of Virginia No Drawing. Application July 10, 1934, Serial No. 734,515

11 Claims. (Cl. 23—116)

This invention relates to the manufacture of hyposulphites and more particularly relates to an improved process whereby the yields are materially increased and the hyposulphite is accordingly produced more economically than by processes heretofore employed. The invention is of especial value as applied to the manufacture of sodium hyposulphite.

In the manufacture of hyposulphites, the corresponding bisulphite has been commonly used as a raw material. For example, sodium bisulphite has been caused to react with metallic sodium or with metallic sodium and sulphur dioxide as indicated below.

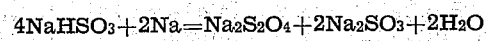

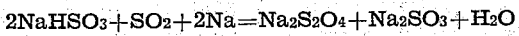

The metallic sodium for the above reactions is customarily supplied in the form of sodium amalgam such as results from the electrolysis of caustic soda in a mercury-cathode cell and these methods have become generally known by amalgam methods.

Processes for the manufacture of hyposulphites involving the above or similar reactions result in low yields of the hyposulphites. This is largely due to the formation of the corresponding sulphite. By the second reaction given above, one mol of sodium sulphite is formed for every mol of the desired product and by the first reaction, two mols of sodium sulphite are formed for every mol of the hyposulphite. The yield of the hyposulphite is accordingly lowered.

The synthesis of a hyposulphite from the corresponding metallic element and sulphur dioxide in a water-phase has, for a long time, been considered impossible. More recently some success has been obtained by reacting metallic sodium with sulphur dioxide in an aqueous solution of a neutral salt of a mediumly strong acid such as $H_3PO_4$, $H_2SO_3$, etc., or in an aqueous solution of such a salt made acid with a free acid such as HCl, $H_3PO_4$, $H_2SO_4$, for example. By that process, it has been found necessary to use these acids or salts in such amounts as would maintain a hydrogen ion concentration of 6—7 throughout the reaction.

By my improved process, sodium hyposulphite may be prepared directly from sodium amalgam and sulphur dioxide gas in a water-phase without the introduction of extraneous acids or salts, as hereinafter more fully described.

According to the present invention, sodium amalgam is supplied to an enclosed corrosion-resisting vessel equipped with stirring mechanism and cooling means. Pure water and $SO_2$ gas are passed into the vessel and intimately contacted with the amalgam by means of the stirring mechanism. The sulphur dioxide reacts with the sodium of the amalgam in the presence of the water to form the corresponding hyposulphite which is in turn dissolved by the water and is withdrawn from the vessel in aqueous solution.

As the reaction is exothermic, prohibitive temperatures may result unless cooling means are provided. For this purpose, I provide cooling coils or a jacket through which cool water may be circulated. I find that beneficial results are obtained by maintaining the reacting materials at a temperature approximating 20°–35° C. The temperature is with advantage limited not to exceed about 40°–45° C.

The process is readily adaptable to continuous operation. When operated in a continuous manner, the amalgam, sulphur dioxide gas and water are continuously supplied to a reaction zone in an appropriate vessel and intimately contacted therein, for example, by continuous agitation. Leaving the reaction zone, the amalgam separates out as a lower stratum from which spent amalgam is continuously withdrawn. Similarly, the water carrying the hyposulphite in solution forms an upper stratum from which it is continuously allowed to overflow from the vessel. The spent amalgam is returned to an electrolytic cell to be regenerated.

I find that particularly economical results are obtained by supplying the amalgam and $SO_2$ gas to the process in such amounts that the metallic sodium and sulphur dioxide are present in their approximate combining ratios though reasonable deviations from these proportions do not materially affect the chemical reactions.

It is important that sufficient water be used to dissolve the hyposulphite as formed. I prefer to use distilled water though this is not absolutely essential if substantially pure water can be otherwise obtained. The sulphur dioxide gas used should be substantially pure and best results are obtained when 100% $SO_2$ gas is used.

As a specific example of the use of my improved process in the manufacture of sodium hyposulphite, sodium amalgam containing 0.1366% metallic sodium by weight was continuously passed through a covered reaction vessel of glass, equipped with a stirrer and a glass cooling coil, at the rate of 132.7 cc. per minute, equivalent to 2.4 grams of metallic sodium per minute. The amalgam used was obtained by the electrolysis of 30% caustic soda solution in a mercury cathode electrolytic cell operating on three volts direct current and drawing 254 amperes which, in this particular cell, gave a current density of about 2.64 amperes per square decimeter. Simultaneously pure water was supplied to the reducing vessel at the rate of 34.5 grams per minute and pure, 100%, sulphur dioxide gas was admitted to the reaction vessel at the rate of 6.8 grams per minute. The temperature of the vessel was maintained at about 20°–25° C. and the stirrer was continuously operated so as to afford intimate contact between the materials in the vessel. The aqueous solution of sodium hyposulphite was continuously withdrawn from the reducing vessel through an overflow and was found to contain 186.5 grams of sodium hyposulphite per liter.

The amalgam may also be prepared by the electrolysis of sodium chloride in a mercury cathode cell.

By my improved process, the customary use of the bisulphite as a raw material is eliminated and the formation of the sulphite as a byproduct is avoided. The yield of hyposulphite is very materially increased and also the resulting hyposulphite liquors are much more concentrated and less contaminated than those obtained by previously known processes. The economical advantages of this increased yield and greater purity are readily apparent.

The effect of the elimination of bisulphite from the reaction on the yield of hyposulphite, and the concentration of the hyposulphite liquors obtained therefrom is illustrated by results obtained from tests in which sodium bisulphite was supplied to the reaction in varying amounts in aqueous solution. Where the solution contained 236 grams of bisulfite per liter the yield, based on sulphur, was 36.8% and the concentration of hyposulphite in the resultant liquors was 141.5 grams per liter. Where the concentration of the bisulphite solution supplied to the reaction was reduced to 81.3 grams per liter, the yield of hyposulphite, based on sulphur, was 47.6% and the concentration of the hyposulphite in the resulting liquors was 147.5 grams per liter. Where the use of the bisulphite was entirely eliminated and pure water fed to the system in accordance with the present invention, the hyposulphite yield, based on sulphur, was 66.2% and the concentration of hyposulphite in the resulting liquors was 186.5 grams per liter. Sulphur is one of the largest items of cost in the manufacture of hyposulphites and consequently this increased yield greatly reduces the cost of production.

This process is also useful in the manufacture of hyposulphites of the other alkali metals.

I claim:

1. In the manufacture of alkali metal hyposulphites the process comprising intimately contacting water, sulphur dioxide gas and liquid alkali metal amalgam in the absence of extraneous acids or salts at a temperature not exceeding 45° C.

2. In the manufacture of sodium hyposulphite the process comprising intimately contacting water, sulphur dioxide gas and liquid sodium amalgam in the absence of extraneous acids or salts at a temperature not exceeding 45° C.

3. In the manufacture of sodium hyposulphite the process comprising intimately contacting water, sulphur dioxide gas and a liquid sodium amalgam in the absence of extraneous acids or salts while maintaining the zone of contact at a temperature of approximately 20°–35° C.

4. Process for the manufacture of sodium hyposulphite comprising continuously supplying liquid sodium amalgam, water and sulphur dioxide gas to a reaction zone, intimately contacting these materials therein in the absence of extraneous acids or salts while maintaining the temperature of the reaction zone at approximately 20°–35° C. and continuously withdrawing spent amalgam, water and sodium hyposulphite from the reaction zone.

5. Process for the manufacture of sodium hyposulphite comprising continuously passing liquid sodium amalgam through an enclosed vessel, intimately contacting the amalgam while passing through said vessel with water and sulphur dioxide gas in the absence of extraneous acids or salts while maintaining a temperature of approximately 20°–35° C. and continuously withdrawing hydrosulphite liquors from the vessel.

6. Process of the manufacture of sodium hyposulphite comprising continuously supplying to a reaction zone liquid sodium amalgam and sulphur dioxide gas in amounts approximating the combining ratios of the sulphur dioxide and the sodium of the amalgam, supplying water to the reaction zone, maintaining the temperature of the reaction zone at approximately 20°–35° C., intimately contacting these materials while in the reaction zone in the absence of extraneous acids or salts and continuously withdrawing spent amalgam and sodium hyposulphite liquors from said zone.

7. Process for the manufacture of sodium hyposulphite comprising continuously supplying to a reaction zone metallic sodium in the form of liquid sodium amalgam, sulphur dioxide gas and water in the approximate relative proportions 2.4, 34.5 and 6.8 maintaining the temperature of the reaction zone at approximately 20°–35° C., intimately contacting these materials in the reaction zone in the absence of extraneous acids or salts and continuously withdrawing spent amalgam and sodium hyposulphite liquor from said zone.

8. A process for the manufacture of alkali metal hyposulphites which consists in intimately contacting water, sulphur dioxide gas and liquid alkali metal amalgam while maintaining the zone of contact at a temperature approximating 20–35° C.

9. A process for the manufacture of alkali metal hyposulphites which consists in intimately contacting water, sulphur dioxide gas and liquid alkali metal amalgam while maintaining the zone of contact at a temperature not exceeding 45° C.

10. A process for the manufacture of sodium hyposulphite which consists in intimately contacting water, sulphur dioxide gas and liquid sodium amalgam while maintaining the zone of contact at a temperature not exceeding 45° C.

11. In the manufacture of alkali metal hyposulphites the process comprising continuously supplying to a reaction zone liquid alkali metal amalgam and sulphur dioxide gas in amounts approximating the combining ratios of the sulphur dioxide and the alkali metal of the amalgam, supplying water to the reaction zone, maintaining the temperature of the reaction zone at approximately 20°–35° C., intimately contacting these materials while in the reaction zone and continuously withdrawing spent amalgam and alkali metal hyposulphite liquors from said zone.

KURT WILLIAM FREDDY DORPH.

CERTIFICATE OF CORRECTION.

Patent No. 2,204,476.  June 11, 1940.

KURT WILLIAM FREDDY DORPH.

It is hereby certified that error appears in the printed specification of the above numbered patent requiring correction as follows: Page 1, first column, line 23, for the word "by" read --as--; page 2, first column, line 65, claim 3, strike out the article "a"; and second column, line 16, claim 5, for "hydrosulphite" read --hyposulphite--; line 17, claim 6, for "Process of" read --Process for--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.